(12) United States Patent
Muona et al.

(10) Patent No.: US 7,900,712 B2
(45) Date of Patent: Mar. 8, 2011

(54) HYDRAULIC SYSTEM FOR MINING EQUIPMENT AND METHOD OF ADJUSTING POWER OF ROCK DRILL MACHINE

(75) Inventors: Jouko Muona, Siuro (FI); Jaakko Niemi, Tampere (FI); Jukka Osara, Hämeenkyrö (FI); Tapani Pöysti, Tampere (FI); Vesa Uitto, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 157 days.

(21) Appl. No.: 10/543,169

(22) PCT Filed: Jan. 23, 2004

(86) PCT No.: PCT/FI2004/000034
§ 371 (c)(1),
(2), (4) Date: Jul. 22, 2005

(87) PCT Pub. No.: WO2004/065761
PCT Pub. Date: Aug. 5, 2004

(65) Prior Publication Data
US 2006/0120892 A1 Jun. 8, 2006

(30) Foreign Application Priority Data
Jan. 24, 2003 (FI) .................................. 20030115

(51) Int. Cl.
*B23Q 5/26* (2006.01)
(52) U.S. Cl. .................................. 173/4; 173/8; 173/11
(58) Field of Classification Search .................. 173/1, 4, 173/8, 11
See application file for complete search history.

(56) References Cited

U.S. PATENT DOCUMENTS

| 3,146,593 | A | | 9/1964 | Stacey |
| 3,547,205 | A | * | 12/1970 | Nagely ......................... 173/105 |
| 3,670,826 | A | * | 6/1972 | Hanson et al. ..................... 173/4 |
| 3,720,059 | A | | 3/1973 | Schurawski et al. |
| 3,893,525 | A | * | 7/1975 | Dower et al. ................... 175/24 |
| 3,979,944 | A | * | 9/1976 | Salmi et al. ....................... 173/8 |
| 4,033,129 | A | * | 7/1977 | Hetzler et al. ................. 60/486 |
| 4,074,771 | A | * | 2/1978 | Morrison ......................... 173/6 |
| 4,246,973 | A | * | 1/1981 | Mayer ................................ 173/8 |
| 4,356,871 | A | * | 11/1982 | Fujikawa ......................... 173/8 |
| 4,369,848 | A | * | 1/1983 | Salmi et al. ....................... 173/8 |
| 4,474,253 | A | * | 10/1984 | Kleuters ......................... 175/94 |
| 4,514,796 | A | * | 4/1985 | Saulters et al. ................. 700/13 |
| 4,601,000 | A | * | 7/1986 | Montabert ...................... 173/11 |
| 5,131,475 | A | * | 7/1992 | Beney ............................... 173/1 |
| 5,449,047 | A | * | 9/1995 | Schivley, Jr. .................. 175/27 |

(Continued)

FOREIGN PATENT DOCUMENTS

DE 27 51 663 5/1978

(Continued)

*Primary Examiner* — Rinaldi I Rada
*Assistant Examiner* — Gloria R Weeks
(74) *Attorney, Agent, or Firm* — Drinker Biddle & Reath LLP

(57) ABSTRACT

In a hydraulic system for mining equipment and a method of adjusting the power of a rock drill machine, at least one mining actuator used for detaching rock is connected to a dedicated separate hydraulic circuit having a special hydraulic pump. The power of the mining actuator is adjusted by changing the hydraulic power generated by the separate hydraulic circuit of the hydraulic pump.

10 Claims, 3 Drawing Sheets

U.S. PATENT DOCUMENTS

| | | | |
|---|---|---|---|
| 5,564,455 A * | 10/1996 | Keating et al. | 137/2 |
| 5,771,981 A * | 6/1998 | Briggs et al. | 173/4 |
| 6,298,927 B1 * | 10/2001 | Back | 175/52 |
| 6,505,689 B1 | 1/2003 | Pöysti et al. | |
| 6,938,702 B2 * | 9/2005 | Saha et al. | 173/1 |
| 7,198,117 B2 * | 4/2007 | Uitto | 175/27 |
| 7,654,337 B2 * | 2/2010 | Noel | 173/1 |
| 2001/0003317 A1 * | 6/2001 | Klemm | 173/222 |
| 2003/0127250 A1 * | 7/2003 | Dycus et al. | 175/57 |
| 2005/0056439 A1 * | 3/2005 | Saha et al. | 173/1 |

FOREIGN PATENT DOCUMENTS

| | | |
|---|---|---|
| EP | 0 300 080 | 1/1989 |
| EP | 0 665 381 B1 | 8/1995 |
| FI | 54018 | 5/1978 |
| FI | 81886 | 8/1990 |

\* cited by examiner

HYDRAULIC SYSTEM FOR MINING EQUIPMENT AND METHOD OF ADJUSTING POWER OF ROCK DRILL MACHINE

FIELD OF THE INVENTION

The invention relates to a hydraulic system for mining equipment comprising: at least one hydraulic circuit with pressure fluid channels and at least one hydraulic pump, the hydraulic pump being arranged to generate hydraulic power in the hydraulic circuit; at least one power unit for driving the hydraulic pump; at least one hydraulic mining actuator connected to the hydraulic circuit and configured to act on a tool in the mining equipment; at least one hydraulic auxiliary actuator connected to the hydraulic circuit; and means for adjusting the hydraulic power to be led to the mining actuator and the auxiliary actuator connected to the hydraulic circuit.

The invention further relates to a method of adjusting the power of a rock drill machine, the rock drill machine comprising at least the following drilling actuators: a percussion device, a rotation device and a feed device, of which at least one is connected to a hydraulic circuit, the method comprising: generating hydraulic power in said hydraulic circuit with at least one hydraulic pump; driving the drilling actuator connected to the hydraulic circuit by the hydraulic power acting in the hydraulic circuit; adjusting the power of the drilling actuator connected to the hydraulic circuit by adjusting the hydraulic power to be fed to the drilling actuator.

BACKGROUND OF THE INVENTION

Modern rock drilling rigs comprise one or more hydraulic pumps, the pressure fluid flow obtained from which is guided by means of suitable valves along pressure fluid channels to hydraulic actuators, such as the percussion device, the rotation device and the feed device of the rock drill machine, comprised by the rock drilling rig, and further to the cylinders that move the booms and to the turning device of the carrier. The hydraulic pressure and hydraulic flow obtained from the hydraulic pump are adjusted with adjusting members arranged in the pressure fluid channels of the actuators, such as with pressure regulators and restrictors in a manner enabling the feed of necessary hydraulic power to each actuator. Unfortunately, such adjusting members cause significant power losses in a hydraulic system. A further drawback in present systems is that when an actuator receiving a large oil flow is used, e.g. a boom cylinder, it may affect the pressure and flow of the entire hydraulic system and thus interfere with the operation of other actuators connected to the hydraulic system.

BRIEF DESCRIPTION OF THE INVENTION

The object of the present invention is to provide a new and improved hydraulic system for different mining equipments.

The hydraulic system of the invention is characterized in that the hydraulic system comprises a main hydraulic circuit and at least one separate hydraulic circuit, and that the main hydraulic circuit and each separate hydraulic circuit are separate from each other, each having a separate hydraulic pump for generating hydraulic power; that at least one mining actuator is connected to the separate hydraulic circuit, and that said mining actuator is configured to be driven by the hydraulic power acting in the separate hydraulic circuit; and that the power of the mining actuator connected to the separate hydraulic circuit is arranged to be adjusted by adjusting the hydraulic power generated by the hydraulic pump comprised by the separate hydraulic circuit.

The method of the invention is characterized by adjusting the power of the drilling actuator connected to the hydraulic circuit mainly by adjusting the pumping output of the hydraulic pump.

The essential idea of the invention is that the hydraulic system of mining equipment comprises one or more mining actuators configured to act via a tool on the object being processed. Depending on the application, the mining actuators may thus include a percussion device, a rotation device and a feed device.

Furthermore, the hydraulic system of the invention comprises at least one hydraulic mining actuator connected to a dedicated separate hydraulic circuit for which hydraulic power is generated with a dedicated hydraulic pump. The hydraulic pump of the separate hydraulic circuit is not in connection with the other hydraulic circuits of the system. The power of the mining actuator connected to the separate hydraulic circuit is adjusted by acting on the hydraulic power generated by the hydraulic pump.

An advantage of the invention is that no external hydraulic components other than a hydraulic pump are required in the pressure fluid channels of the separate hydraulic circuit for adjusting the flow and the pressure, whereby power losses caused by such components, such as pilot valves, restrictors or the like, are avoided. However, if need be, control valves can be used in the separate hydraulic circuit for switching on and off the hydraulic power and for selecting the direction of movement of the mining actuator. Since valves employed in controlling the pressure fluid flows are not used for power control, the control valves can be simple ON/OFF type of valves. Such simple control valves can be arranged in the vicinity of the actuator to be controlled. In addition, the size of the flow openings of the control valves is relatively easy to dimension large enough for the control valves not to cause significant power losses in the separate hydraulic circuit. A further advantage of the invention is that the use of hydraulic actuators external to the separate hydraulic circuit does in no way affect the operation of the mining actuator connected to the separate hydraulic circuit. Another advantage is that the magnitude of the pressure fluid flow fed to the mining actuator connected to the separate hydraulic circuit is always known to the control unit, which facilitates the control of the mining actuator.

The essential idea of an embodiment of the invention is that the separate hydraulic circuit comprises a dedicated pressure fluid tank, and that the separate hydraulic circuit uses pressure fluid that is separate from the other hydraulic circuits of the hydraulic system. This being so, the pressure fluid employed in the separate hydraulic circuit can be selected advantageously in view of the performance and usability of the mining actuator connected to the separate hydraulic circuit. The chemical texture, viscosity, additives and other properties of the pressure fluid can be selected irrespective of the requirements set by the other actuators comprised by the hydraulic system.

The essential idea of an embodiment of the invention is that each mining actuator comprised by the hydraulic system is arranged in a dedicated separate hydraulic circuit. In this case, the performance of all functions directly related with mining is controlled by means of hydraulic pumps.

The essential idea of an embodiment of the invention is that the hydraulic power fed to the separate hydraulic circuit is acted on by adjusting the displacement capacity of the hydraulic pump comprised by the separate hydraulic circuit.

The essential idea of an embodiment of the invention is that the hydraulic power fed to the separate hydraulic circuit is acted on by adjusting the speed of rotation of the hydraulic pump comprised by the separate hydraulic circuit.

The essential idea of an embodiment of the invention is that the hydraulic power fed to the separate hydraulic circuit is acted on by adjusting the speed of rotation and the displacement capacity of the hydraulic pump comprised by the separate hydraulic circuit.

BRIEF DESCRIPTION OF THE FIGURES

The invention will be described in detail in the accompanying drawings, in which.

For the sake of clarity, the figures show the invention in a simplified manner. In the figures, like parts are designated by like reference numerals.

DETAILED DESCRIPTION OF THE INVENTION

Figure 1:
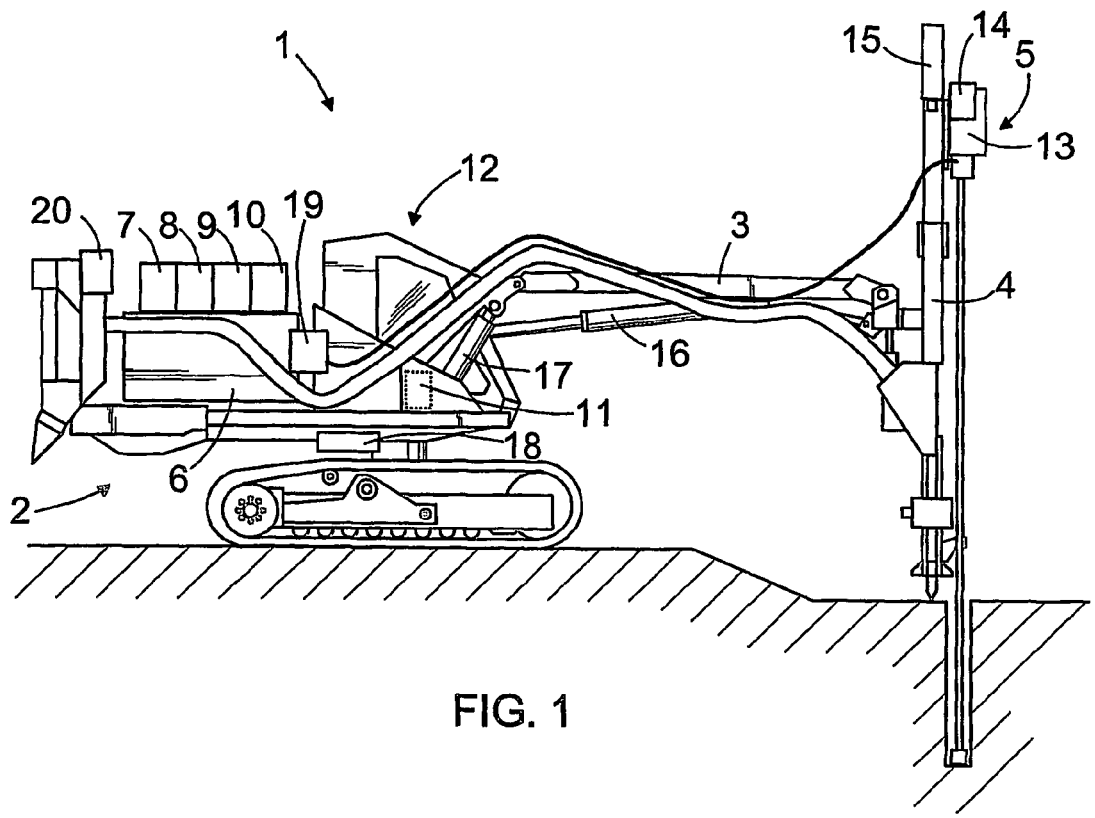
FIG. 1 is a schematic side view of mining equipment provided with a rock drill machine.

FIG. 1 shows mining equipment according to the invention. In the present application, mining equipment refers to a device that drills or breaks material from the earth crust or a part thereof. In FIG. 1, a rock drilling rig 1 is involved. The rock drilling rig 1 comprises a movable carrier 2 onto which is arranged at least one movable working boom 3. The free end of the working boom 3 is provided with a feed beam 4, along which a rock drill machine 5 is movable. On the other hand, the feed beam 4 can be arranged directly on the carrier. Furthermore, on the carrier 2 is arranged a power unit 6, which may be a combustion engine or an electric motor. The power unit 6 is arranged to use hydraulic pumps 7 to 10, which are used to generate the necessary pressure fluid flows for driving the hydraulic actuators comprised by the rock drilling rig 1. The hydraulic pumps 7 to 10 are controlled by means of a control unit 11, which is preferably located in a control cabin 12 of the rock drilling rig 1. The hydraulic actuators include e.g. a percussion device 13, a rotation device 14 and a feed device 15 of the rock drill machine 5, and further cylinders 16 and 17 for moving the boom 3, and a turning device 18 for turning the carrier 2. Furthermore, the motors of a flushing pump 19 and a dust collecting system 20 can be hydraulic. In some cases, the carrier 2 can also be driven hydraulically, for instance by means of hydraulic hub motors.

Figure 2:
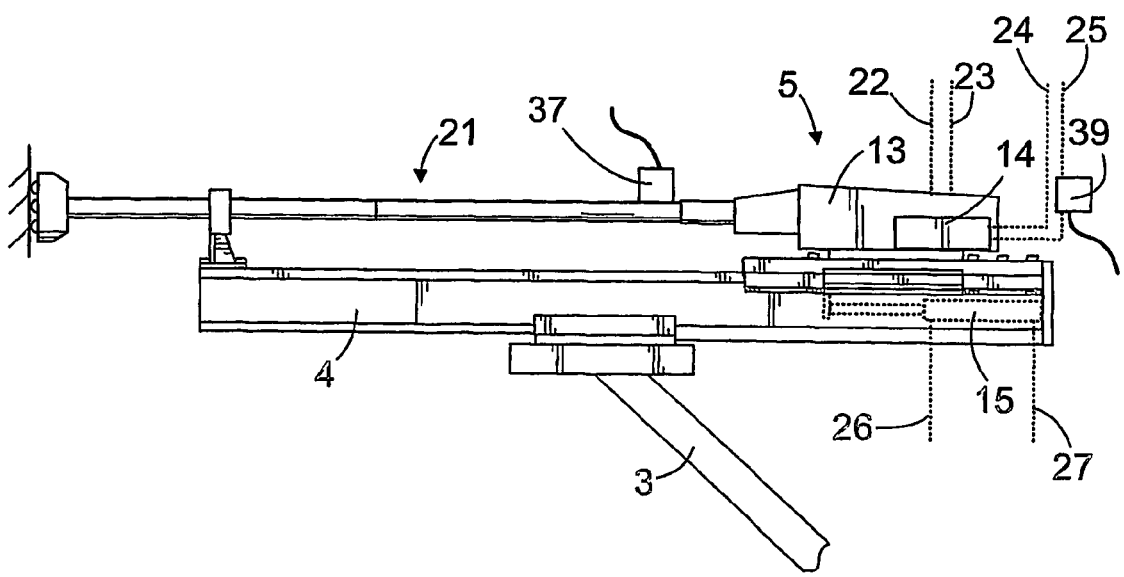
FIG. 2 is a schematic side view of a rock drill machine connected to a hydraulic system according to the invention, FIG. 3 schematically shows a hydraulic system according to the invention, FIG. 4 schematically shows a second hydraulic system according to the invention, FIG. 5 schematically shows a third hydraulic system according to the invention.

FIG. 2 shows a rock drill machine 5 that is intended for percussion drilling and comprises a hydraulic percussion device 13 for applying impacts to a tool 21 connected to the rock drill machine 5 and, further, a hydraulic rotation device 14 for turning the tool 21 around its axis. Pressure fluid flow is applied to the percussion device 13 along a channel 22 and led away along a channel 23. Similarly, the rotation device 14 is connected to pressure fluid channels 24 and 25. Furthermore, the feed device 15 is in connection with pressure fluid channels 26 and 27. The feed device 15 may be a cylinder as shown in FIG. 2 or, alternatively, it can be a hydraulic motor. One or more sensors 37, 39 can be arranged in connection with the rock drill machine 5 for monitoring the operation of the drill machine 5, such as stresses present in the tool 21 and the pressure of the pressure fluid channels. The results of the monitoring are transmitted from the sensors to the control unit 11 of the rock drilling rig 1.

Figure 3:
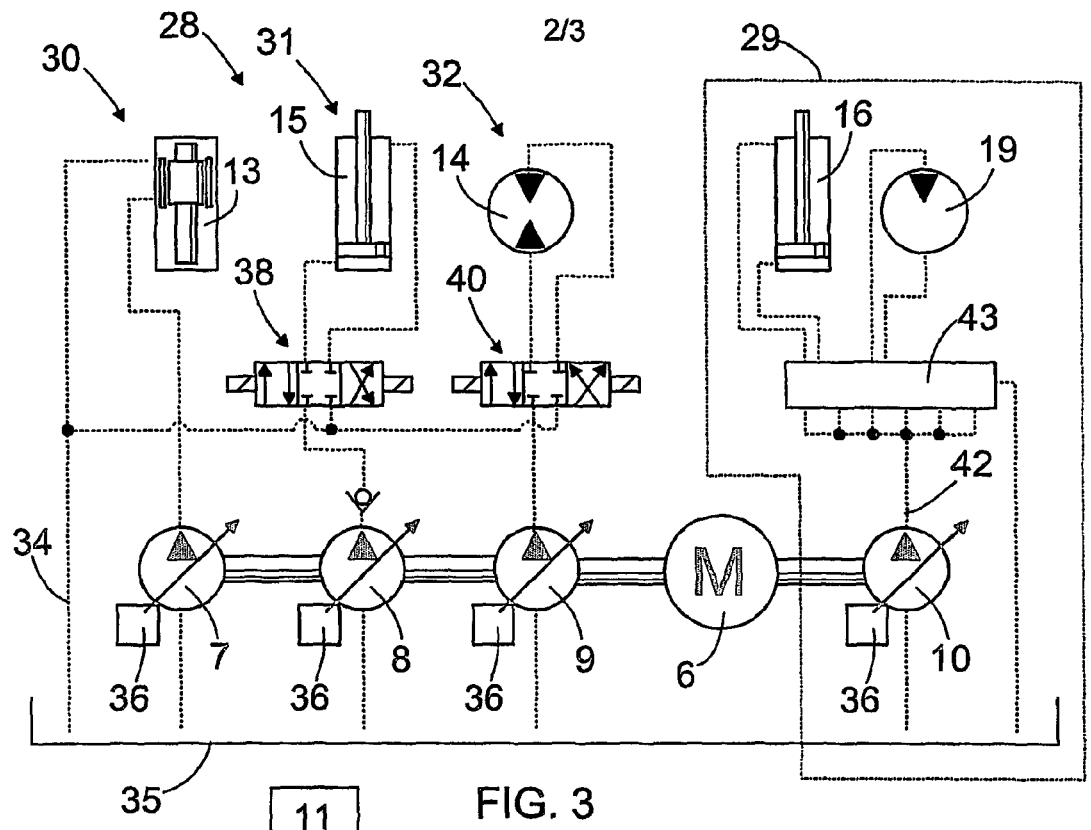

FIG. 3 shows a hydraulic system 28 for a percussive rock drilling rig 1 comprising a main hydraulic circuit 29 and three separate hydraulic circuits 30, 31, 32, one for each mining actuator 13, 14, 15. The main hydraulic circuit 29 is arranged to drive the auxiliary actuators, for instance the cylinders 16 and 17 of the boom 3, the actuators used for moving the carrier 2, the flushing pump 19, and the motors of the dust collecting system 20. The first separate hydraulic circuit 30 is arranged to drive the percussion device 13, the second separate hydraulic circuit 31 is arranged to drive the actuator 15 and, further, the third separate hydraulic circuit 32 is arranged to drive the rotation device 14.

Pressure fluid flow and pressure are generated in the first separate hydraulic circuit 30 by means of at least one first hydraulic pump 7. Means for controlling the operation cycle of the percussion device 13 are usually integrated therein. A back and forth movable percussion piston, for example, can be controlled by means of a control spool arranged around the percussion piston. Consequently, the pressure fluid can be led directly from the pump 7 to the input port of the percussion device 13 and, correspondingly, from the discharge port of the percussion device 13 directly into a discharge channel 34 and further into a tank 35. The power of the percussion device 13 is adjusted by adjusting the volume flow of the first hydraulic pump 7. When the percussion device 13 is not needed, for example during transfers, the volume flow generated by the hydraulic pump 7 is adjusted to minimum. In connection with the hydraulic pump 7 is an adjusting unit 36 for adjusting the displacement capacity of the pump 7. The control unit 11 controls the adjusting unit 36.

Hydraulic power is generated into the second separate hydraulic circuit 31 at least by means of the second hydraulic pump 8. In the pressure fluid channels leading to the feed device 15 is arranged a first control valve 38, which is controlled by the control unit 11. In the middle position of the control valve 38 shown in FIG. 3, the feed device 15 is stopped. By shifting the control valve 38 into its leftmost position, the feed device 15 is made to move in a first travel direction, and, correspondingly, the rightmost position causes the actuator to move in a second travel direction. Consequently, the control valve 38 only controls pressure fluid flows, but does not adjust pressure or flow. The speed of movement and feed force of the feed device 15 are adjusted by adjusting the pressure fluid flow generated by the second hydraulic pump 8. The displacement capacity of the second hydraulic pump 8 is adjusted by means of the adjusting unit 36, which, in turn, is controlled by the control unit 11.

Hydraulic power is generated into the third separate hydraulic circuit 32 at least by means of the third hydraulic pump 9. In the pressure fluid channels leading to the rotation device 14 is arranged a second control valve 40, which is controlled by the control unit 11. The speed of rotation and the rotational torque are adjusted by adjusting the displacement capacity of the third hydraulic pump 9 by means of the adjusting unit 36. The adjusting unit 36 is controlled by the control unit 11.

In the solution of FIG. 3, the discharging pressure fluid is led from the separate hydraulic circuits 30, 31 and 32 into the common discharge channel 34 and further to the common tank 35. When a common discharge channel 34 is used, the number of pressure fluid channels in the mining equipment can be reduced. In addition, the use of one wide discharge channel 34 reduces flow resistances and thus improves the performance of the hydraulic system 28.

The main hydraulic circuit 29 is provided with at least one main hydraulic pump 10, the pressure fluid flow and pressure generated by which are led along a channel 42 to a manifold or a corresponding adjusting and control member 43, which in turn distributes the pressure fluid to the auxiliary actuators 16 and 19 arranged in the main hydraulic circuit 29. The power of the auxiliary actuators 16, 19 is adjusted by using the adjusting and control member 43 to adjust the pressure and flow of the pressure fluid fed to said actuator. The adjusting and control member 43 is controlled by means of the control unit 11. Alternatively, the hydraulic components acting on the control of pressure fluid and the adjustment of power can be arranged in a decentralized manner in the pressure fluid channel of each actuator. In the solution of FIG. 3, the displacement capacity of the main hydraulic pump 10 can be adjusted by means of the adjusting unit 36.

In the hydraulic system 28 according to FIG. 3, all hydraulic pumps 7, 8, 9 and 10 are arranged to be driven by one common power unit 6. Such an arrangement is possible when hydraulic pumps having an adjustable displacement capacity are used.

Let it be pointed out that the control unit 11 comprises at least one computer, programmable logics or another control device suitable for the purpose. An adjustment strategy may be stored in the memory of the control unit 11, whereby the processor of the control unit 11 generates the necessary control signals based on the adjustment strategy and the monitoring results. The information on the volume flow obtained from the pumps 7 to 10 and the information on the pressure obtained from the sensors 39 can be utilized in the power control of the actuators.

Figure 4:
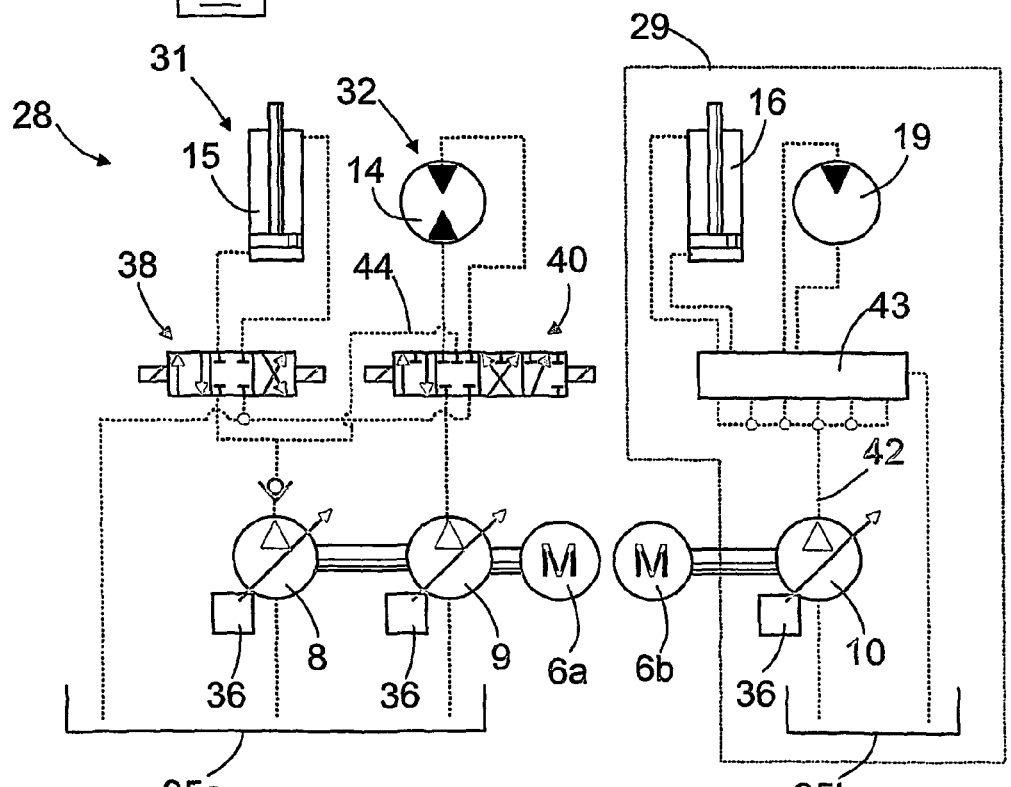

FIG. 4 shows another hydraulic system 28 according to the invention. This solution differs from that of FIG. 3 firstly in that it comprises no percussion device 13. Such a hydraulic system 28 is usable in what are known as rotary devices, wherein the rotation device 14 of the rock drill machine is used to rotate the tool around its axis, the tool being simultaneously pressed strongly against the rock with the feed device 15. On the other hand, the solution of FIG. 4 is also applicable when the percussion device is electrically driven. In FIG. 4, the hydraulic pumps 8 and 9 of the second separate hydraulic circuit 31 and the third separate hydraulic circuit 32 are driven by one common power unit 6a, the main hydraulic pump 10 being driven with a dedicated power unit 6b. Furthermore, the separate hydraulic circuits 31 and 32 have a dedicated tank 35a and, correspondingly, the main hydraulic circuit has a dedicated tank 35b. Another difference is the structure and coupling of the valve 40. Shifting the second control valve 40 to its rightmost position in FIG. 4, allows the hydraulic power of the third hydraulic pump 9 to be fed along a channel 44 to the second separate hydraulic circuit 31. This results in a larger pressure fluid flow and a more efficient rapid feed of the feed device 15.

Figure 5:
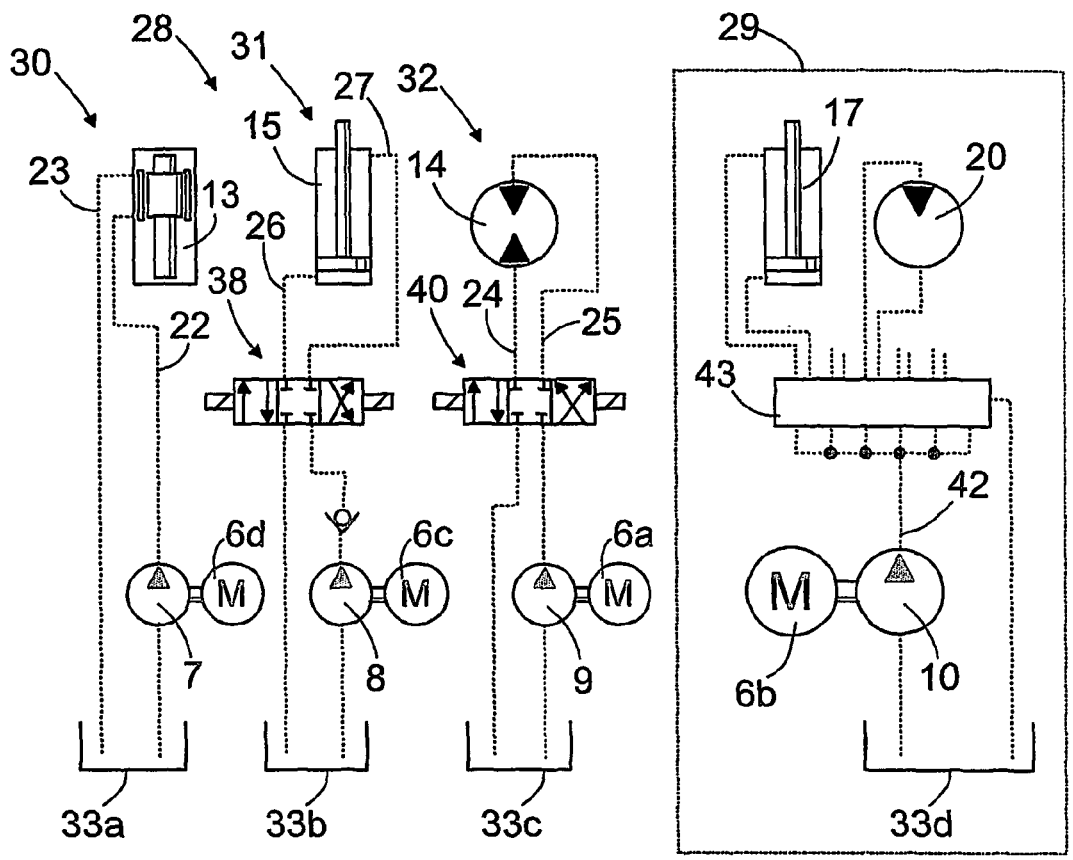

In the hydraulic system 28 shown in FIG. 5, driving power is applied to the hydraulic pumps 7, 8, 9 of each separate hydraulic circuit 30, 31, 32 separately from the power units 6a, 6c and 6d. In this case, the hydraulic power generated by the hydraulic pumps 7, 8 and 9 is adjusted by adjusting their speed. Accordingly, the hydraulic pumps 7, 8 and 9 may be constant volume pumps, which have a simpler structure and lower price compared with adjustable pumps. The speed of rotation of the pumps 7, 8 and 9 can be adjusted for instance by means of a gear system. Particularly in an electrically driven device, the natural power unit is an electric motor whose speed of rotation can be adjusted for instance by means of a frequency converter. A further advantage of this solution is that the entity formed by a hydraulic pump and a power unit is easy to place onto the carrier 2, enabling freer layout of the carrier 2 than previously. In addition, the hydraulic pumps can be placed as close to the actuator to be driven as possible, resulting in optimally small losses caused by the pressure channels.

In FIG. 5, each separate hydraulic circuit 30, 31, 32 has also a dedicated tank 33a, 33b, 33c and, further, the main hydraulic circuit 29 has a dedicated tank 33d. In this case, for instance a pressure fluid having a higher viscosity can be used in the separate hydraulic circuits 30, 31, 32, and a pressure fluid having a low viscosity in the main hydraulic circuit 29.

Figure 6:
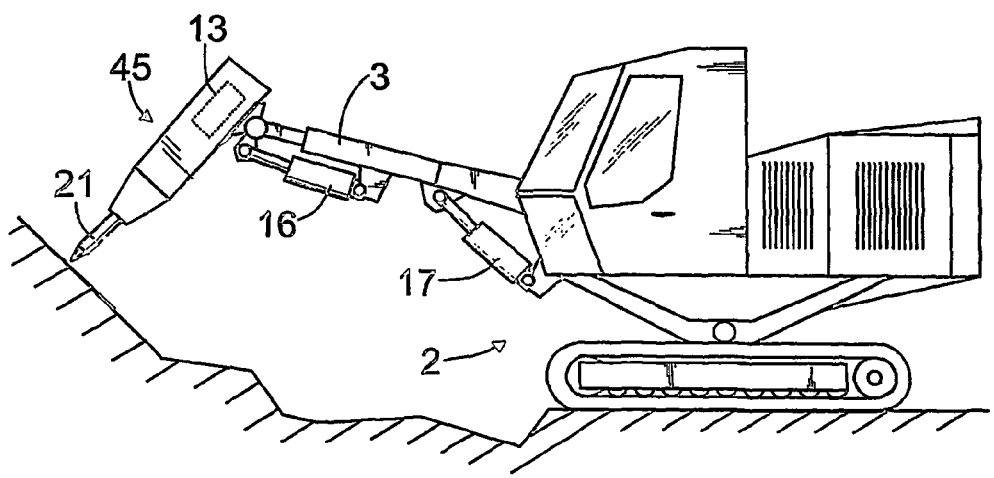
FIG. 6 is a schematic side view of mining equipment provided with a hydraulic hammer.

FIG. 6 shows mining equipment provided with a hydraulic percussion hammer 45. The percussion device 13 comprised by the percussion hammer 45 is used to apply impact pulses to the tool 21, which transfers the impact pulses to the object being processed, thus resulting in the breaking of the material. The hydraulic system of such mining equipment may resemble for instance that shown in FIG. 5, except that it lacks the second separate hydraulic circuit 31 for driving the feed device 15 and, further, the third separate hydraulic circuit 32 for driving the rotation device 14.

In some cases, one of the mining actuators 13, 14, 15 may be coupled to the main hydraulic circuit 29 in a conventional manner.

The drawings and the related description are only intended to illustrate the inventive idea. The details of the invention may vary within the scope of the claims.

The invention claimed is:

1. A hydraulic system for mining equipment, comprising:
   at least one hydraulic circuit with pressure fluid channels and at least one hydraulic pump, the hydraulic pump being arranged to generate hydraulic power in the hydraulic circuit;
   at least one power unit for driving the hydraulic pump;
   at least one hydraulic mining actuator connected to the hydraulic circuit and configured to act on a tool in the mining equipment;
   at least one hydraulic auxiliary actuator connected to the hydraulic circuit; and
   means for adjusting the hydraulic power to be led to the mining actuator and the auxiliary actuator connected to the hydraulic circuit, wherein
   the hydraulic system comprises a main hydraulic circuit and at least one separate hydraulic circuit, and the main hydraulic circuit and each separate hydraulic circuit are operationally separate from each other, each having a separate hydraulic pump for generating hydraulic power; at least one mining actuator is connected to the separate hydraulic circuit and said mining actuator is configured to be driven by the hydraulic power acting in the separate hydraulic circuit; and
   the power of the mining actuator connected to the separate hydraulic circuit is arranged to be adjusted by adjusting the generated hydraulic power by adjusting pumping output of the hydraulic pump of the separate hydraulic circuit, wherein
   the hydraulic pump of the separate hydraulic circuit is controlled by means of a control unit including an adjustment strategy,
   the pressure of the fluid channel leading from the pump to the mining actuator of the rock drilling machine is monitored by means of a sensor, the information on the pressure obtained from the sensor is transmitted to the control unit, the information on the volume flow obtained from the hydraulic pump of the separate hydraulic circuit is monitored, and the power of the mining actuator of the rock drilling machine is controlled according to the pressure and flow information and the adjustment strategy, and wherein there are no external hydraulic components other than a hydraulic pump in the pressure fluid channels of the separate hydraulic circuit for adjusting the flow and the pressure.

2. A hydraulic system as claimed in claim 1, wherein the power of the mining actuator connected to the separate hydraulic circuit is arranged to be adjusted by adjusting the hydraulic pressure generated by the hydraulic pump comprised by the separate hydraulic circuit.

3. A hydraulic system as claimed in claim 1, wherein the power of the mining actuator connected to the separate hydraulic circuit is arranged to be adjusted by adjusting the hydraulic flow generated by the hydraulic pump comprised by the separate hydraulic circuit.

4. A hydraulic system as claimed in claim 1, wherein the mining actuator is selected from the group consisting of: a percussion device arranged to generate impact pulses in the tool connected to the mining equipment; a rotation device arranged to rotate the tool connected to the mining actuator relative to its axis; and a feed device arranged to push the tool connected to the mining actuator in the axial direction.

5. A hydraulic system as claimed in claim 1, wherein the mining actuator is a percussion device, the percussion device is connected to a first separate hydraulic circuit having a percussion device-specific first hydraulic pump, and the power of the percussion device is arranged to be adjusted by adjusting said hydraulic pump.

6. A hydraulic system as claimed in claim 1, wherein the hydraulic system comprises a plurality of mining actuators that each mining actuator is connected to a dedicated separate hydraulic circuit, and the power of each mining actuator is arranged to be adjusted by acting on the hydraulic pump comprised by said separate hydraulic circuit.

7. A hydraulic system as claimed in claim 1, wherein the hydraulic pump of each separate hydraulic circuit is arranged to be driven by a dedicated power unit and the hydraulic power acting in each separate hydraulic circuit is arranged to be adjusted by acting on the speed of rotation of the hydraulic pump by means of the power unit.

8. A hydraulic system as claimed in claim 1, wherein at least one separate hydraulic circuit comprises a pressure fluid tank separate from the other hydraulic circuits, the pressure fluid of said separate hydraulic circuit being arranged separate from the pressure fluids of the other hydraulic circuits.

9. A hydraulic system as claimed in claim 1, wherein the hydraulic system comprises a plurality of separate hydraulic circuits, and the separate hydraulic circuits have a common pressure fluid tank separate from the main hydraulic circuit the common pressure fluid used in the separate hydraulic circuits being arranged separate from the pressure fluid of the main hydraulic circuit.

10. A hydraulic system as claimed in claim 1, wherein the hydraulic power acting in the separate hydraulic circuit is arranged to be adjusted by changing the displacement capacity of the hydraulic pump comprised by said separate hydraulic circuit.

* * * * *